United States Patent [19]

Cohen

[11] Patent Number: 5,642,472
[45] Date of Patent: Jun. 24, 1997

[54] SOFTWARE DISCOVERY SYSTEM

[75] Inventor: William W. Cohen, North Plainfield, N.J.

[73] Assignee: Lucent Technologies Inc., Murray Hill, N.J.

[21] Appl. No.: 246,437

[22] Filed: May 20, 1994

[51] Int. Cl.⁶ ........................................ G06F 3/00
[52] U.S. Cl. ............................................. 395/77
[58] Field of Search ........................ 395/77; 364/200, 364/300, 900

[56] References Cited

U.S. PATENT DOCUMENTS

| | | | |
|---|---|---|---|
| 4,370,707 | 1/1983 | Phillips et al. | 364/200 |
| 4,860,203 | 8/1989 | Corrigan et al. | 364/300 |
| 5,038,316 | 8/1991 | Hempleman et al. | 364/900 |

OTHER PUBLICATIONS

T. J. Biggerstaff, "Design Recovery for Maintenance and Reuse", Chapter 12, *Reverse Engineering and Design Recovery* Reprinted from *IEEE Computer*, Jul. 1989.

W. W. Cohen, "Grammatically Biased Learning: Learning Logic Programs Using and Explicit Antecedent Description Language", *Artificial Intelligence*, 68 (1994) 303–366.

C. Rich and L. M. Wills, "Recognizing a Program's Design: A Graph–Parsing Approach", *Reverse Engineering and Design Recovery*, IEEE, 1990.

P. T. Breuer and K. Lano, "Creating Specifications from Code: Reverse–Engineering Techniques", *Reverse Engineering and Design Recovery, Software Maintenance: Research and Practice*, vol. 3, 145–162 (1991).

I. Bratko, M. Grobelnik, "Inductive Learning Applied to Program Construction and Verification", *ILP '93 Workshop*, Bled.

S. Muggleton and C. Feng, "Efficient Induction of Logic Programs", Chapter 13, *Inductive Logic Programming*, Editor: Stephen H. Muggleton, Publisher: Academic Press, 1992, pp. 281–298.

J. Kietz and S. Wrobel, "Controlling the Complexity of Learning in Logic Through Syntactic and Task–Oriented Models", Chapter 16, *Inductive Logic Programming*, Editor: Stephen H. Muggleton, Publisher: Academic Press 1992, pp. 335–359.

*Primary Examiner*—Robert W. Downs
*Assistant Examiner*—Sanjiv Shah

[57] ABSTRACT

Apparatus and methods which employ a machine learning system to "learn" the specification for a program from a trace of an execution of the program on a set of test problems. The program is instrumented to produce the trace. Performance is improved by means of a declarative bias which expresses knowledge of the user about the program and constrains the learning system to produce only specifications which are consistent with the declarative bias. The apparatus and methods of the preferred embodiment are employed to learn specifications of views in a data base for a telephone switching system from traces produced by executing the programs which produce the views. Techniques for producing more than one specification and for dealing with views which involve conversions are also disclosed.

18 Claims, 5 Drawing Sheets

```
begin
    return FindOne (Examples,A,[],[body(A)])
end begin FindOne(Example,A,s_1,s_2):
    if s_2 contains a terminal symbol not in s_1 then
        let t_1,...,t_k be the sequence of terminal symbols in s_2
        if At_1,...,t_k is not consistent with the Examples then
            return "FAIL"
        elseif s_2 is a sentence then return s_2 endif
    endif
    for each s_3 ∈ Children (s_2) do
        let r=FindOne(example,A,s_2,s_3)
        if r≠"FAIL" then return r endif
    endfor
    return "FAIL"
end FindOne begin Children(s):
return the set of all sequences s' that can be formed by applying
    a single grammar rule to the leftmost nonterminal of s
end
```

```
begin
    return FindAll (Examples,A,[],[body(A)])
end begin FindAll(Example,A,s_1,s_2):
    if s_2 contains a terminal symbol not in s_1 then
        let t_1,...,t_k be the sequence of terminal symbols in s_2
        if At_1,...,t_k is not consistent with the Examples then
            return ∅
        elseif s_2 is a sentence then return {s_2} endif
    endif
    let RET= ∅
    for each s_3 ∈ Children (s_2) do
        let RET = CompactUnion(RET,FindAll(Examples,A,s_2,s_3))
    endfor
    return RET
end FindAll begin CompactUnion(s_1,s_2):
    if s_1 = ∅ then return s_2
    else
        let α,β,γ and δ be such that s_1 = αγβ and s_1 = αδβ
        return α(γ × δ)β
    endif
end
```

| ID | DEPT | FNAME | LNAME | MI |
|---|---|---|---|---|
| 921-31-3273 | SALES | JANE | JONES | Q |
| 421-43-4532 | SALES | DAVE | JONES | Q |

VIEW $v_1$: 603

| SSNUM | FIRST | MI | LAST |
|---|---|---|---|
| 421-43-4532 | DAVE | Q | JONES |
| 921-31-3273 | JANE | Q | JONES |

$v_1(A,B,C,D) \leftarrow r(A,Z,B,D,C)$.  605

FIG. 7

701(1) — trace ($v_1$(421-43-4532,DAVE,JONES,Q), [r(421-43-4532,SALES,DAVE,JONES,Q)]).

702(2) — trace ($v_1$(921-31-3273,JANE,DAVIS,Q), [r(921-31-3273,SALES,JANE,DAVIS,Q)]).

FIG. 8

801 {
  trace(v₁(A,B,C,D),[r(E,F,G,H,I)]) ←
    r(E,F,G,H,I),
    A=E,
    B=G,
    C=H,
    D=I.
}

901 body(trace(View,[Rel])) → projection(View,Rel) where true.
projection(View,Rel) →
    Rel,give_values(ViewCols,RelCols)
where
    declared_view(View,ViewCols),
    declared_relation(Rel,RelCols).

FIG. 10

MATERIALIZED VIEW v₂:

| FIRST | LAST |
|-------|-------|
| JANE  | JONES |
| DAVE  | SMITH |
| ⋮     | ⋮     |

1001

RELATION n:

| FNAME | LNAME | LOGIN |
|-------|-------|-------|
| JANE  | JONES | JONES |
| DAVE  | SMITH | SMITH |
| ⋮     | ⋮     | ⋮     |

1003 v₂(FIRST,LAST) ←
    n(FNAME,LNAME,LOGIN),
    FIRST=FNAME,
    LAST=LNAME.

1005 v₂(FIRST,LAST) ←
    n(FNAME,LNAME,LOGIN),
    FIRST=FNAME,
    LAST=LOGIN.

1007

SOFTWARE DISCOVERY SYSTEM

1 FIELD OF THE INVENTION

This invention relates to systems for discovering information in collections of data and, more particularly, to discovery systems for obtaining specifications of computer programs.

2 BACKGROUND OF THE INVENTION

An important problem in software engineering is the maintenance of "legacy" programs, that is, programs which were originally written many years ago but are still being used, and consequently must be modified when bugs are discovered or new features are added. The legacy program problem is becoming ever more pressing. Software, unlike the hardware it runs on, does not wear out, and consequently can be used for as long as there are computers which can execute it. Further, in many modern devices such as telephone switches or data base systems, the software is the most expensive component of the system, and consequently will be completely rewritten only if there is no other practical alternative.

One aspect of the legacy program problem is understanding the program. While understanding software is never easy, understanding a legacy program becomes more difficult over time. The program's original developers have typically left or are doing other things, and whatever documentation originally existed generally does not adequately reflect the many modifications of the software. Indeed, understanding legacy programs is so difficult that it is estimated that more than half of the time spent maintaining a large legacy program is in fact spent learning to understand it.

Software engineers have developed a number of techniques for making programs more understandable. One common method is to construct a "specification" of that system—an abstract description of the system presented in different language, typically a language that is more concise and/or declarative than the language in which the system is implemented. Because no specifications exist for many software systems, techniques for automatic "specification recovery" have been frequently proposed in the software engineering community as an aid in maintaining software systems.

Techniques are known for recovering a specification by analyzing the source code of a software system. Examples of these techniques are described in T. J. Biggerstaff "Design Recovery for Maintenance and Reuse", IEEE Computer, July 1989; P. T. Breuer and K. Lano "Creating Specifications from Code: Reverse Engineering Techniques", Journal of Software Maintenance: Research and Practice, Vol. 3, pp. 145–162, 1991; and C. Rich and L. Wills "Recognizing a Program's Design: A Graph-Parsing Approach", IEEE Software, January 1990. One difficulty with these techniques is that they are limited to source code; in many legacy systems, the source code has been lost or bugs have been fixed by "patching" the executable code, so that there is no longer an exact correspondence between the source code and the executable code. Another difficulty is that source code is complex, and consequently, its analysis is not easy.

What is needed in dealing with legacy programs is a way of getting a specification for the program which simply avoids source code analysis and instead concentrates on what the legacy program actually does.

3 SUMMARY OF THE INVENTION

The invention gets a specification for a program by simply learning the specification from the results of a set of executions of the program. In more detail, the user must instrument the software system being analyzed so that a trace of all program actions (at some appropriate level of abstraction) is recorded whenever the program is executed. Next, the instrumented program is run on a set of representative test problems. This produces a set of traces describing the program's actions on these test problems.

Then, a learning method that produces hypotheses in a first-order abstract declarative language, for instance Prolog, is used to construct from these execution traces one or more general descriptions of the behavior of the program. A declarative bias may be used to restrict the learner to output only those general descriptions that are considered a priori to be plausible. Finally, one or more specifications of the program are derived from these general descriptions of the programs behavior.

The reference numbers in the figures have three or more digits; the rightmost two digits are reference numbers within a figure; the remaining digits are a figure number. Thus, the element with the reference number 103 first appears in FIG. 1.

5 DETAILED DESCRIPTION

The following Detailed Description will first provide some background in the area of the use of inductive learning to produce programs and will then explain how inductive learning techniques are used in the present invention to produce specifications of existing programs.

5.1 Using Inductive Learning to Generate Programs

Experiments have been made in the area of machine learning in reversing the normal process of programming. Normally, the programmer has some idea of the desired results, writes a program to attain the results, tests the program to see whether it attains them, and then repeatedly modifies and tests the program until it does in fact attain them. The idea in the machine learning experiments was to see whether it was possible to give a machine learning system the desired results and have it "learn" a correct program in a first-order abstract, declarative language such as Prolog. Some prior-art techniques for learning Prolog programs are described in J. R. Quinlan "Learning Logical Definitions from Relations", Machine Learning, Vol. 5, No. 3, 1990 and S. Muggleton and C. Feng, "Efficient Induction of Logic Programs", Inductive Logic Programming, Academic Press, 1992.

Machine learning techniques have also been applied to the software engineering tasks of "data reification" and finding "loop invariants", as described in I. Bratko and M. Grobelnik "Inductive learning applied to program construction and verification", Proceedings of the Third International Workshop on Inductive Logic Programming, Bled, Slovenia 1993. Data reification is one of the steps performed in converting an abstract specification of a program to executable code. Loop invariants are logical statements that are true every time a certain point in a program is reached; they are often used in proving the correctness of programs.

A problem with the above learning techniques is that with program results of any complexity whatever, the number of hypotheses the learning system must deal with is enormous. The problem has been addressed by means of a declarative bias which specifies a set of constraints which the hypotheses must satisfy and thereby reduces the number of hypotheses. The declarative bias is provided by the user of the learning system and in effect makes the user's knowledge concerning certain properties of the results available to the learning system. The declarative bias is specified in a declarative language such as a grammar or a set of templates. Techniques for learning Prolog programs with a declarative bias are described in J.-U. Kietz and S. Wrobel "Controlling the Complexity of Learning in Logic Through Syntactic and Task-Oriented Models" Inductive Logic Programming, Academic Press, 1992; and W. W. Cohen "Compiling Knowledge into an Explicit Bias" Proceedings of the Ninth International Conference on Machine Learning, Aberdeen, Scotland, 1992.

In the preferred embodiment of the present invention, the foregoing techniques for obtaining a program from a set of results are applied to the problem of obtaining a specification of a pre-existing program. The method of application is this:

The preexisting program is executed on sets of problem data to obtain traces of the executions; and the learning system is applied to the traces to produce a specification as described above.

The specification is of course a high-level specification in a first-order declarative language such as Prolog. Great improvements in efficiency can be attained by further providing a declarative bias which reflects the understanding of the system's user about certain aspects of the results produced by the preexisting program.

Figure 1:
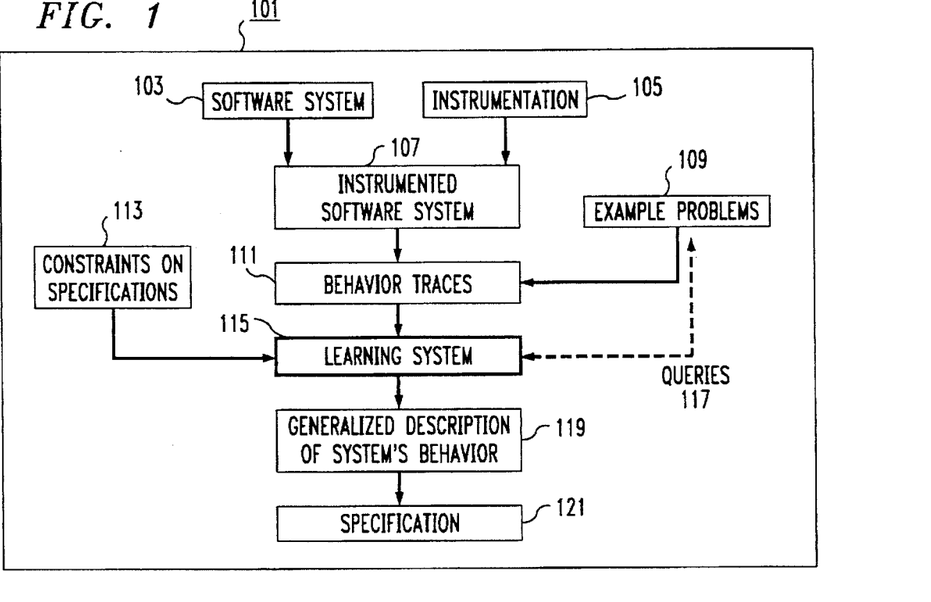
FIG. 1 shows an overview of the invention.

FIG. 1 provides an overview of a preferred embodiment of software discovery system 101. A software system 103, running on a computers for which a specification is to be obtained is instrumented using instrumentation 105 to produce instrumented software system 107, which, when executed on example problems 109, produces behavior traces 111. In the preferred embodiment, the instrumentation is produced as follows:

print statements are added to the source code of the subroutines that form the interface to the data base system so that all database accesses are traced;

print statements are added to the source code of the routines that generate the view tuples, so that generation of the view tuples is traced; and an AWK program which is run on the output. of the print statements to convert the output to a form suitable for the machine learning system.

In the preferred embodiment, it is thus the source code which is instrumented. In other embodiments, the instrumentation may be done by running software system 103 in an execution environment such as those provided by debuggers like the well-known gdb debugger or modifying the object code for software system 103.

The behavior traces 111 and user-provided constraints on specifications 113 are provided to learning system 115, which analyzes behavior traces 111 using constraints 113 to produce a generalized description 119 of the behavior of software system 113. System 101 then produces specification 121 from generalized description 101.

In the preferred embodiment, the technique of FIG. 1 is used to produce specifications in Prolog for a set of database views. The Prolog language is described in "The Art of Prolog: Advances Programming Techniques" by Leon Sterling and Ehud Shapiro, MIT Press 1986, and "Programming in Prolog" by W. F. Clocksin and C. S. Mellish, Springer-Verlag 1981. Prolog is well known to those skilled in the arts of artificial intelligence and software engineering; however, other specification languages, for instance relational algebra, could also be used without departing from the spirit and scope of the invention.

The database system for which specifications are to be recovered is a subsystem of a telephone switching system. A large part of this system is a database, which for the purposes of this example can be regarded as a conventional relational database. In such a database, relationships between items of data are expressed by means of tables. Each table is made up of columns and rows (also called tuples. The columns represent classes of values and each row is a related set of values belonging to the classes. There are two kinds of tables in the system: relations, which express the underlying relationships between the data items in the data base, and views, which are tables made by operations which select rows and columns from one or more of the relations.

The database of the example is optimized for retrieval, and hence information is often stored internally in a redundant and unintuitive format. Thus, the end user accesses the database through one or more of the views. The views are essentially "virtual relations"—they can be accessed and updated in much the same manner as actual relations, but are designed to present a simpler interface to the underlying data. For reasons of efficiency each view is implemented as a C-language subroutine that supports the necessary view operations (for instance, inserting, updating, and deleting tuples.) These C subroutines can be quite complex. For instance, in updating a view, it is often necessary to check that certain integrity constraints are maintained. Integrity constraints may affect many database relations and checking them is often non-trivial.

The preferred embodiment automatically constructs Prolog specifications for these views. The specifications describe how the views are derived from the underlying relations, but need not describe all details of the implementation, such as the integrity constraints enforced by the implementation or the implementation's error handling procedures.

Figure 6:
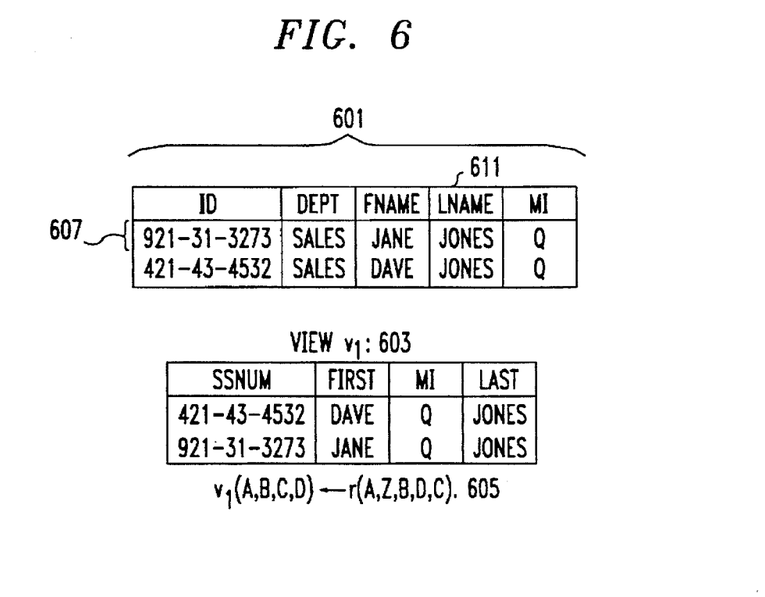
FIG. 6 shows an example relation and view.

As a concrete example of a specification recovery task, consider the relation r 601 of FIG. 6. The relation has two rows 607 and five columns 611. One way in which a user of system 103 can access the information in relation 601 is by view $v_1$ 603, which is a projection of columns 1,3,5 and 4 of relation r. A Prolog specification of this view is shown at 605 of FIG. 6. Specification 605 states that $v_1$ is produced from r by taking columns A,B,D,and C of r and reordering them as columns A,B,C, and D of $v_1$.

Figure 7:
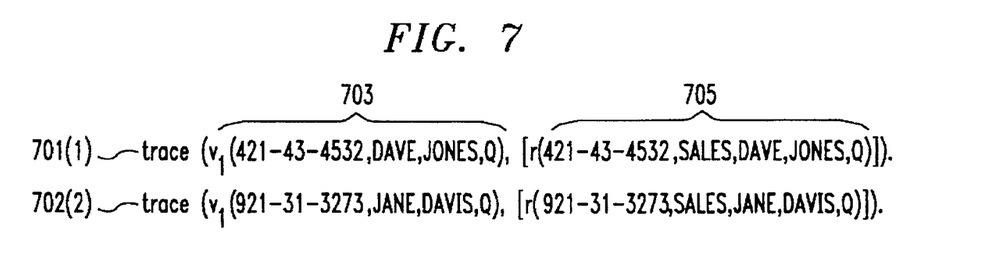
FIG. 7 shows an example trace.

In the preferred embodiment, the code that implements view $v_1$ is first instrumented by the user so that when each tuple t of the view is constructed, a trace is made of the tuple t of $v_1$ and the tuple of r used to construct that tuple t. The trace is shown in FIG. 7, where trace 701(1) contains the first tuple of view $v_1$ 703 and the tuple of r 705 used to construct tuple 703 and trace 701(2) contains the corresponding information for the second tuple of view $v_1$.

The Prolog specification 121 for view $v_1$ is then learned from the trace. The technique used to learn Prolog specification 121 works by finding a program $P_s$ such that $P_s \wedge DB \vdash x_i$ for each program trace $x_i$, where DB is the switch database. $P_s$ must also be a program which agrees with the constraints of constraint specification 113. Program $P_s$ is shown at 803 in FIG. 8.

Figure 8:
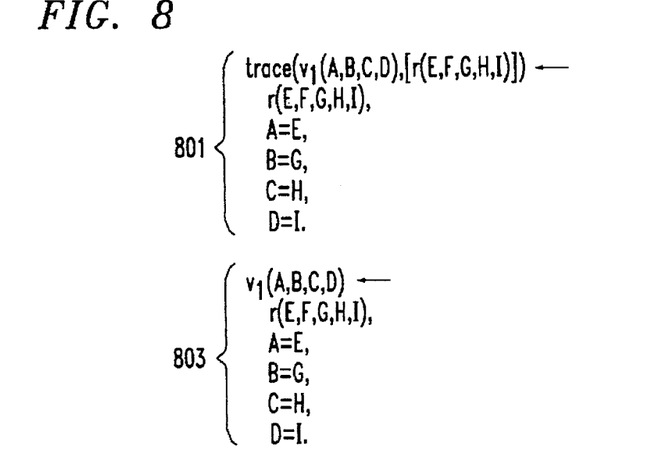
FIG. 8 shows an example generalized description and an example specification.

Program $P_s$ 803 is arrived at by means of program $P_t$ 801, which corresponds to generalized description 119 of FIG. 1. Program $P_t$ 801 in FIG. 8 is generated by learning system 115 from trace 701 of the present example. From program $P_t$ 801, it can be determined that the prolog program $P_s$ 803 is a specification of $v_1$ which is consistent with traces 701. $P_s$ is produced from $P_t$ by a simple syntactic transformation in which the head of $P_s$ is simply the first argument of the head of $P_t$, and the body of $P_s$ is the body of $P_t$.

Prolog learning technique for finding $P_t$ 801 will now be described in detail. The technique is able to efficiently finds a program $P_t$ 801 which generalizes traces 701 and to ensure that this program $P_t$ can be easily converted to a valid specification $P_s$ 803. The learning system is further constrained to output only hypothesis programs that satisfy constraints 113. In the preferred embodiment, the user specifies constraints 113 by providing an "augmented antecedent description grammar". Augmented antecedent description grammars are an extension of antecedent description grammars, which are described in W. W. Cohen "Compiling Knowledge into an Explicit Bias" Proceedings of the Ninth International Conference on Machine Learning, Aberdeen, Scotland, 1992. An augmented antecedent description grammar is a series of rules of the form $$s \rightarrow t_1, \ldots, t_k \text{ where } c_1, \ldots, c_n$$

Each rule specifies that the symbol s can be rewritten as the series of symbols $t_1, \ldots, t_k$, provided that conditions $c_1, \ldots, c_n$ are true. If any of the $t_i$'s or $c_j$'s contain variables (which are in this discussion indicated by words beginning with uppercase letters) then s must be rewritten as $t'_1, \ldots, t'_k$ where $t'_i$ is the result of replacing the variables in $t_i$ with values that also make each $c_j$ true. For instance, the rule $$s(X) \rightarrow t(Y), u(X) \text{ where } Y=\text{add1}(X)$$

would allow replacing the symbol "s(2)" with the sequence "t(add1(2)),u(2)".

Any symbol that cannot be rewritten using any of the rules in a grammar is called a "terminal symbol" of the grammar. One particular symbol in the grammar is designated as the "start symbol" of the grammar. A "sentence" of a grammar is a sequence of the terminal symbols that can be derived from the start symbol by performing rewriting steps in accordance with the rules of the grammar. An augmented antecedent description grammar has a start symbol of the form "body(A)" where "A" is some possible head of a Prolog clause. Any specification of the program being learned must be a Prolog program consisting of a single clause $$A \leftarrow B_1, \ldots, B_k$$

such that the sequence of symbols $B_1, \ldots, B_k$ is a sentence of the grammar, and consequently, learning system 115 can ignore any possible specification for which the sequence of symbols is not a sentence of the grammar.

Figure 9:
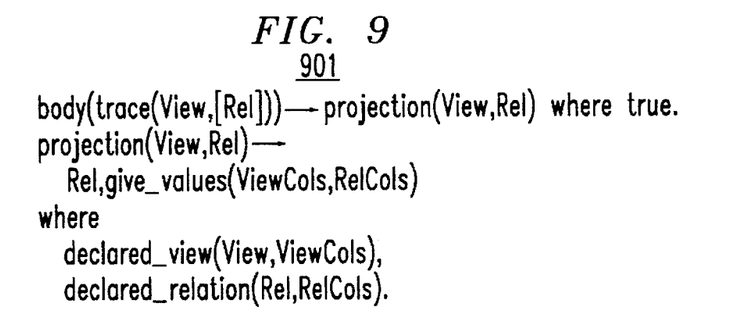
FIG. 9 shows an example declarative bias.

As a concrete example, consider the augmented antecedent description grammar 901 shown in FIG. 9. The first rule says that the start symbol "body(View,[Rel])" can be always be rewritten as the symbol "projection(View,Rel)". The second rule says that "projection(View,Rel)" can be rewritten as the sequence of symbols "Rel,give_values(ViewCols, RelCols)" wherever the conditions "declared_view(View, ViewCols)" and "declared_relation(Rel,RelCols)" are true. For instance, if the user has recorded as true the facts declared_view($v_1$(R,S,T,U),[R,S,T,U]).

declared_relation(r(V,W,X,Y,Z),[V,W,X,Y,Z]).

(representing the declarations that $v_1$ is the view for which a specification is to be derived, that r is a relation in the switch database, and specifying that the lists of arguments for the predicates representing $v_1$ and r should be [R,S,T,U] and [V,W,X,Y,Z] respectively) then the symbol "body(A)" can be rewritten as r(V,W,X,Y,Z),give_values([R,S,T,U],(V,W,X,Y,Z])

If the following additional grammar rules are present give_values([X[ ]], Ys)→give_value(X, Ys) where true.

give_values([X|Xs], Ys)→give_value(X, Ys),give_values(Xs, Ys) where Xs≠[ ].

give_value(X, Ys)→X=Y where member(Y, Ys).

then "body(A)" can be rewritten to any of the following sentences:

$$r(V,W,X,Y,Z),R = V,S = V,T = V,U = V.$$
$$r(V,W,X,Y,Z),R = V,S = V,T = V,U = W.$$
$$r(V,W,X,Y,Z),R = V,S = V,T = V,U = X.$$

·
·

$$r(V,W,X,Y,Z),R = Z,S = Z,T = Z,U = Z.$$

Thus the learner could hypothesize any of these Prolog clauses:

$$\text{trace}(v_1(R,S,T,U),[r(V,W,X,Y,Z)]) \leftarrow r(V,W,X,Y,Z),R = V,S = V,T = V,U = V.$$
$$\text{trace}(v_1(R,S,T,U),[r(V,W,X,Y,Z)]) \leftarrow r(V,W,X,Y,Z),R = V,S = V,T = V,U = W.$$
$$\text{trace}(v_1(R,S,T,U),[r(V,W,X,Y,Z)]) \leftarrow r(V,W,X,Y,Z),R = V,S = V,T = V,U = X.$$

·

$$\text{trace}(v_1(R,S,T,U),[r(V,W,X,Y,Z)]) \leftarrow r(V,W,X,Y,Z),R = Z,S = Z,T = Z,U = Z.$$

Hence the grammar rules above define the set of all views that construct some projection of the columns in the relation r. In an appropriate context, all of these hypotheses might be considered plausible a priori. Also, all of these clauses can be converted easily to a specification of $v_1$. All that needs to be done is to replace the head of the clause with its first argument: for example the clause trace($v_1$(R,S,T,U),[r(V,W,X,Y,Z)])←r(V,W,X,Y,Z),R=V, S=W,T=X,U=Y.

can be converted to $v_1$(R,S,T,U)←r(V,W,X,Y,Z),R=V,S=W,T=X,U=Y.

The constraints specified by the augmented antecedent description grammar of the preferred embodiment include two that reflect special properties of the database system to which the system is applied. The first of these constraints is that any hypothesis must access tuples in the data base in an order which is consistent with the trace of each view tuple. The second is that any hypothesis must be composed of generative clauses, that is, when $v(X_1, \ldots, X_n)$ is the head of a clause in a view specification, each $X_i$ always appears somewhere in the body of the clause. In other words, each hypothesis must use only relations known from the examples to be relevant. For instance, the specifications derived from the clauses generated by the ADG of the example above contain only the variables R,S,T,U in their heads, and all of these variables must also occur in every clause body as well. Thus the specifications produced by the above ADG are generative.

Figure 3:
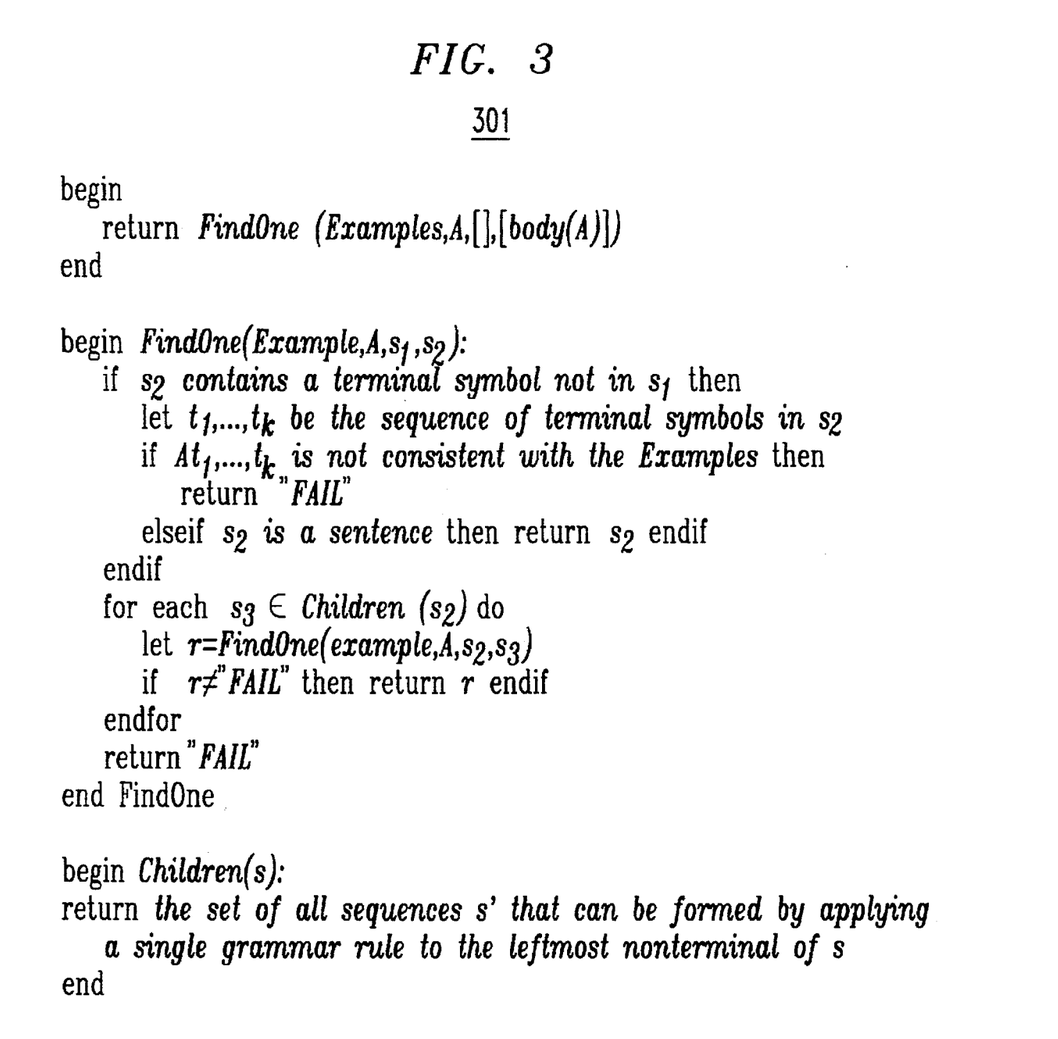
FIG. 3 describes the method used to find a Prolog program consistent with a grammar and a set of examples.

To efficiently search through this space of possible hypotheses for one that is consistent with the examples the following technique is used. Consider the graph of all sequences of symbols that can be derived by the grammar in which an edge connects sequences $s_1$ and $s_2$ if and only if $s_2$ can be derived from $s_1$ by applying a single grammar rule to the leftmost non-terminal symbol in $s_1$. This graph is traversed in a depth-first manner, except that whenever any sequence $s_2$ is reached containing a terminal symbol that is not contained in the parent sequence $s_1$, a test is made to see whether the clause $$A \leftarrow t_1, \ldots, t_k$$

is consistent with the examples, where $t_1, \ldots, t_k$ are the terminal symbols in $s_2$. If this test fails, then the portion of the graph below this point is not searched. (Eliminating portions of a search space in this way is called "pruning" the search space.) If this test succeeds and $s_2$ is a sentence, then $s_2$ is returned as a consistent hypothesis. A description of this search algorithm is given in FIG. 3.

Figure 2:
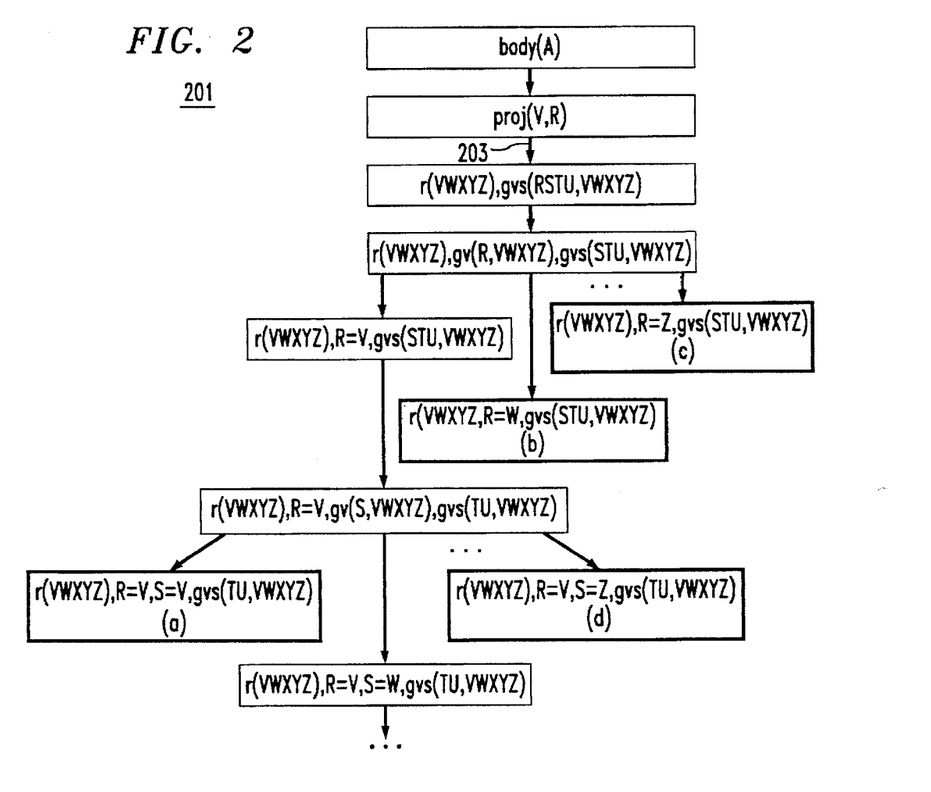
FIG. 2 illustrates the space of Prolog programs that must be searched to find a specification.

The graph and the search procedure is illustrated in FIG. 2, which shows the portions of graph 203 making up an initial portion of search space 201 imposed by the grammar above. For the examples given above, the parts of the graph below the boxed nodes in the figure would not be searched by the search strategy. The portion of the graph below the node labeled a will be pruned because the condition S=V is not true for the examples. Likewise the portions of the graph below the nodes labeled b, c and d will be pruned because the conditions R=W, R=Z, and S=Z do not hold.

Figure 10:
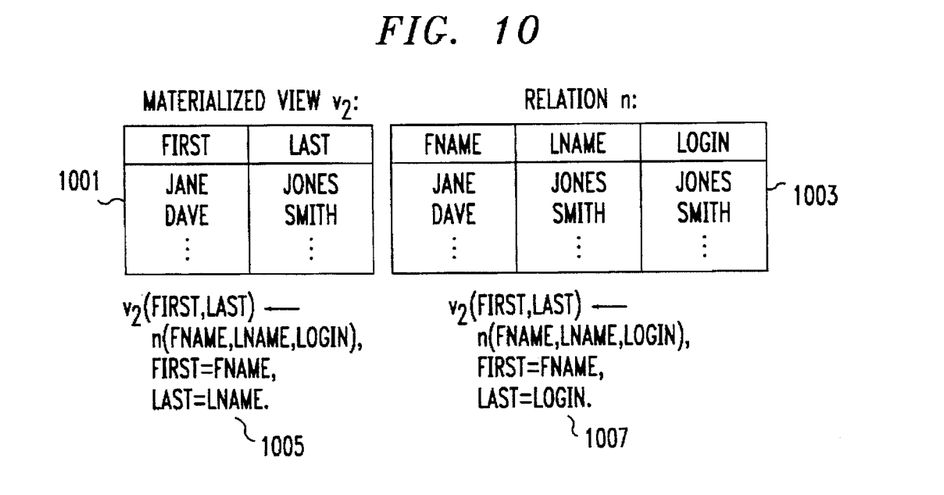
FIG. 10 shows another example relation and view.

One disadvantage of this search procedure is that it returns only a single specification. For the purpose of better understanding the software, it may be helpful to know if there is more than one plausible specification that is consistent with the traces. At the user's discretion, the discovery system of the invention will employ an alternative search procedure that finds all specifications consistent with both the examples and the user's grammar. As another motivation for considering this problem, it is sometimes the case that (for reasons of efficiency data is stored redundantly in a database. FIG. 10 shows an example of such a case. In relation "n" 1003, there is an integrity constraint that requires the "login" field of relation "n" to be identical to the "lname" field: Thus, the specifications 1005 and 1007 of FIG. 10 are both equally valid specifications of view $v_2$ 1001.

Figure 4:
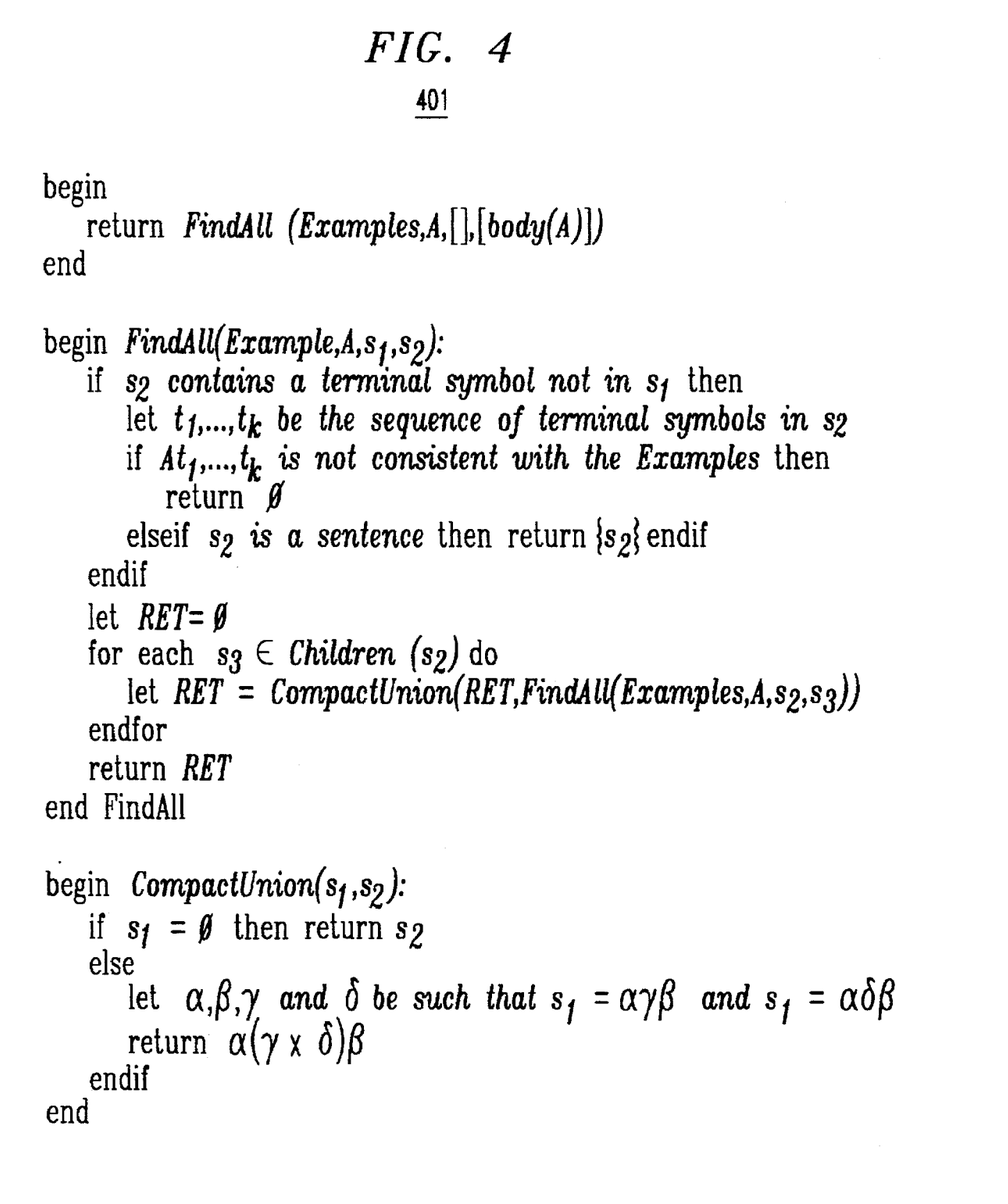
FIG. 4 describes the method used to find all Prolog programs consistent with a grammar and a set of examples, and to express this set of programs in a compact.

To find sets of consistent specifications, another depth-first search of the same graph is used. A description of this search algorithm 401 is given in FIG. 4. This search procedure uses the same rules for pruning away parts of the graph; however, the search does not stop when the first consistent hypothesis is found. Instead, at each nonleaf node in the graph, all child nodes are searched, and the union of the sets of consistent hypotheses found at any child node are returned.

To keep the set of hypotheses from growing too large, a special compact representation is used for unions on hypotheses. Notice that at the leaf nodes in the graph, the only sets that must be represented are singleton sets. At the next-highest level of the graph, the only sets that must be unioned together are sets of sentences that were derived from a string $\alpha N \beta$ by rewriting the first nonterminal symbol N to a string of terminal symbols. That is, the only unions that must be represented are of the form $$\{\alpha \tau_1 \beta\} \cup \ldots \cup \{\alpha \tau_n \beta\}$$

where the $\tau_i$'s are sequences of terminal symbols. Such sets can also be represented by an expression of the form $$\alpha,(\tau_1 \times \ldots \times \tau_n),\beta$$

More generally, one can show by mathematical induction that at any level i steps away from the leaves, the only unions that must be represented are of the form $$\{\alpha \gamma_1 \beta\} \cup \ldots \cup \{\alpha \gamma_n \beta\}$$

where $\alpha$, $\beta$, and all of the $\gamma_i$'s can be represented by an expression containing "×" symbols, as shown above. Thus one can always represent sets compactly with an expression of the form $$\alpha,(\gamma_1 \times \ldots \times \gamma_n),\beta$$

where $\alpha$, $\beta$, and the $\gamma_i$'s are themselves expressions for sets, written in this compact notation.

An a simple example of the operation of this procedure, suppose that one has the grammar body(a)→B,C
B→$b_1$.
B→$b_1$.
B→$b_3$.
C→$c_1$.
C→$c_2$.

and the examples are consistent with all of the following clauses:

a←$b_1,c_1$.
a←$b_3,c_1$.
a←$b_1,c_2$.
a←$b_3,c_2$.

Figure 5:
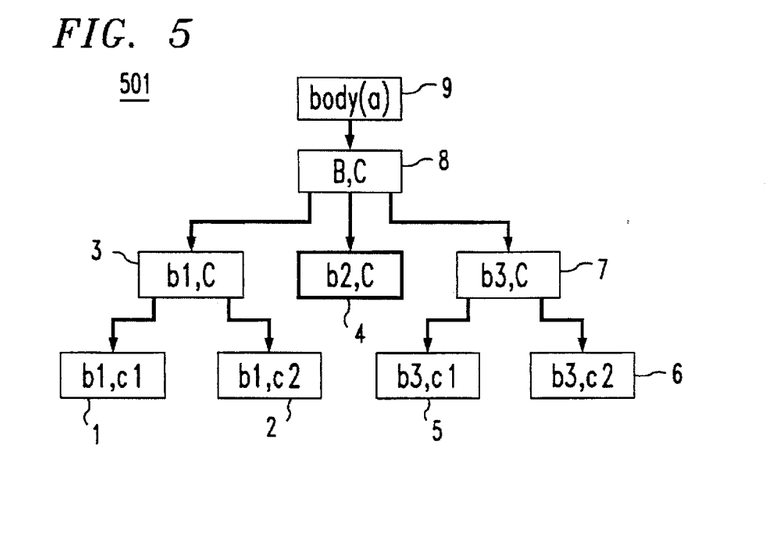
FIG. 5 illustrates the space of programs searched by these methods for another example problem.

The search graph for the above example appears as graph 501 in FIG. 5 and the sets RET returned by algorithm 401 at each node in graph 501 would be as follows:

Node 1: $b_1,c_1$
Node 2: $b_1,c_2$
Node 3: $b_1,(c_1 \times c_2)$
Node 4: ∅
Node 5: $b_3,c_1$
Node 6: $b_3,c_2$
Node 7: $b_3,(c_1 \times c_2)$
Node 8: $(b_1 \times b_3),(c_1 \times c_2)$
Node 9: $(b_1 \times b_3),(c_1 \times c_2)$ The final output to the user would be the set of clauses listed above as being consistent with the data, expressed in this compact form:

$$a \leftarrow (b_1 \times b_3),(c_1 \times c_2)$$

Another shortcoming of the implementation described above is that it cannot deal with situations where data is not simply copies from a relation to a view, but rather undergoes a conversion step. For example, in the specification below, view $v_6$ is a copy of q with every value of "0" in the third column replaced by the empty string.

$v_6$(VProblemCode, VSeverity, VHelpBufId)←

RPCode=VProblemCode, q(RPCode, RLevel, RTextBufId),

VSeverity=RLevel, zero2nullstr(RTextBufId, VHelpBufId).

zero2nullstr(0,").

zero2nullstr(Id,Id)←Id≠0.

Learning views with conversion functions like zero2nullstr is very difficult since a wide range of conversions are performed. We addressed this problem by extending the implementation to generate view specifications that contain determinations. A determination between two variables X and Y is denoted Y⊰X, and indicates that the value of Y can be functionally derived from the value of X. Using determinations, $v_6$ could be specified $v_6$(VProbleraCode, VSeverity, VHelpBufH)←

RPCode=VProblemCode, q(RPCode,RLevel,RTextBufId),

VSeverity=RLevel,

VHelpBufId⊰RTextBufId.

Specifications with determinations are even more abstract than the Prolog specifications generated by the preferred embodiment; in particular, they cannot be used to find all tuples in a view. However, they are still useful for program understanding.

The learning system of the preferred embodiment requires almost no changes to incorporate determinations. The only difference is that in the pruning phase, the test to see if a clause A: $-t_1, \ldots, t_k$ (where the $t_i$'s are terminal symbols) is a bit more complex. A terminal symbol "X⊰Y" is considered consistent *unless* there are two examples in which (X, Y) are bound to (x1,y1) and (x2, y2) respectively where y1=y2 but x1 and x2 are different. Put another way, the symbol "X⊰Y" is consistent whenever it is consistent to believe that X can be functionally derived from Y given the data.

5.2 Results of Application of the Techniques

As earlier indicated, the foregoing techniques have been used to obtain specifications of views in a database belonging to a telephone switching system. In that application, specifications were extracted for a number of views, including views that contain many (up to 92) columns, views that depend on relations that contain many (up to 90) columns, and views that depend on more than one relation (for example, views that are a projection of the join of two relations, rather than the projection of a single relation.) The invention has also been applied to views that have large implementations, consisting of up to 2900 lines of C source code.

An important feature of the foregoing techniques is the following: while system 101 cannot return a specification 121 for every program it analyzes, the specifications 121 which it does return will be correct. For that reason, system 101 can be usefully employed to make a first analysis of a set of programs, while other tools can be applied to those programs for which system 101 does not return specifications.

The discovery system of the invention can be implemented on a digital computer. Such a digital computer is programmed to accept input in the form of an instrumented software system, a set of example problems for the software system, an augmented antecedent description grammar, and then to carry out the method described above. Creation of such a program is well within the capability of one skilled in the art.

5.3 Conclusion

The foregoing Detailed Description has disclosed to those skilled in the arts of machine learning and software discovery how machine learning techniques may be applied to traces generated by executions of a pre-existing program to obtain a specification of the pre-existing program. While the techniques disclosed herein are the best presently known to the inventor, other learning techniques could also be used without departing from the spirit and scope of the invention. Other search methods could be employed to search the space defined by a declarative bias: for instance, the search method for antecedent description grammars described in W. W. Cohen "Compiling Knowledge into an Explicit Bias" Proceedings of the Ninth International Conference on Machine Learning, Aberdeen, Scotland, 1992. Also, learning techniques employing different "learning protocols" could be employed. Moreover, learning techniques are known that do not require a declarative bias, but instead constrain the hypotheses of the learner by negative examples which are generated automatically from positive examples, together with information about the completeness of the set of positive examples, and such techniques could be employed in the invention. One such techniques is described in J. R. Quinlan "Learning Logical Definitions from Relations", Machine Learning, Vol. 5, No. 3, 1990. Further, learning techniques are known that enrich the set of examples provided by posing "queries" about the system being learned; one such technique is described in "Algorithmic Program Debugging" by Ehud Shapiro, MIT Press, 1982. The dashed portions of FIG. 1 indicate how such queries could be incorporated into the invention. Employing either of these sorts of learning methods would be consistent with the spirit and scope of the invention. It will also be clear to those skilled in the art that specification languages other than Prolog could be employed; that other classes of specification recovery problems could be considered, for example recovering specifications of communications protocols, could also be considered, again without departing from the spirit and scope of the invention; and that other learning techniques could be employed to carry our the method of the invention.

That being the case, the Detailed Description is to be understood as being in all respects illustrative and exemplary, but not restrictive, and the scope of the invention is not to be defined by the Detailed Description, but rather by the claims as interpreted with the full breadth permitted by the law.

What is claimed is:

1. A method performed on or with the aid of a computer for deriving a specification in a first order language of a computer program from an execution thereof on a set of test problems, the method comprising the steps of:

producing a trace of the execution; and employing a machine learning system to learn the specification from the trace.

2. The method set forth in claim 1 further comprising the step of:

providing the machine teaming system with additional information from a user which constrains the specification.

3. The method set forth in claim 2 wherein:

the step of prodding the additional information includes the step of providing a declarative bias specifying the additional information.

4. The method set forth in claim 1 wherein:

the computer program is a program which makes a view from at least one relation and the specification specifies how tuples of the view are derived from tuples of the relation;

the step of producing a trace of the execution which produces examples of the view tuples; and the step of employing a machine teaming system learns the specification from the examples.

5. The method set forth in claim 4 wherein:

the step of producing a trace further includes in each example a list of the relation tuples read in producing the example.

6. The method set forth in claim 2 wherein:

the computer program is a program which makes a view from one or more relations and the specification specifies how tuples of the view are derived from tuples of the relation;

the step of producing a trace of the execution produces examples of the view tuples; and the step of employing a machine learning system learns the specification from the examples.

7. The method set forth in claim 6 wherein:

the step of producing a trace further includes in each example a list of relation tuples read in producing the example.

8. The method set forth in claim 7 wherein:

the step of providing the additional information includes the step of specifying a constraint that the specification must access the relation in an order consistent with the examples.

9. The method set forth in claim 7 wherein:

the step of providing the additional information includes the step of specifying a constraint that each value in the view must appear in the relation.

10. Computer apparatus for deriving a specification in a first order language of a computer program from an execution thereof on a set of test problems, the apparatus comprising:

means for producing a trace of the execution; and machine learning means for learning the specification from the trace.

11. The apparatus set forth in claim 10 further comprising:

means for providing the machine teaming means with additional information which constrains the specification.

12. The apparatus set forth in claim 11 wherein:

the means for providing provides a declarative bias specifying the additional information.

13. The apparatus set forth in claim 10 wherein:

the computer program is a program which makes a view from at least one relation and the specification specifies how tuples of the view are derived from tuples of the relation;

the means for producing a trace of the execution produces examples of the view tuples; and the means for employing a machine teaming system learns the specification from the examples.

14. The apparatus set forth in claim 13 wherein:

the means for producing a trace further includes in each of the examples a list of the tuples of the relation read in producing the example.

15. The apparatus set forth in claim 11 wherein:

the computer program is a program which makes a view from one or more relations and the specification specifies how tuples of the view are derived from tuples of the relation;

the means for producing a trace of the execution produces examples of the view tuples; and the means for machine learning learns the specification from the examples.

16. The apparatus set forth in claim 15 wherein:

the means for producing a trace further includes in each example a list of relation tuples read in producing the example.

17. The apparatus set forth in claim 16 wherein:

the means for providing the additional information specifies a constraint that the specification must access the relation in an order consistent with the examples.

18. The apparatus set forth in claim 16 wherein:

the means for providing the additional information specifies a constraint that each value of the view must appear in the relation.

* * * * *